(12) United States Patent
Deb

(10) Patent No.: US 8,801,010 B2
(45) Date of Patent: Aug. 12, 2014

(54) SCOOTER

(71) Applicant: Onima, Inc., Plainfield, IL (US)

(72) Inventor: Satyajit Deb, Plainfield, IL (US)

(73) Assignee: Onima, Inc., Plainfield, IL (US)

( * ) Notice: Subject to any disclaimer, the term of this patent is extended or adjusted under 35 U.S.C. 154(b) by 0 days.

(21) Appl. No.: 13/674,493

(22) Filed: Nov. 12, 2012

(65) Prior Publication Data

US 2014/0131981 A1 May 15, 2014

(51) Int. Cl.
| | | |
|---|---|---|
| *B62M 1/00* | (2010.01) | |
| *B62K 3/00* | (2006.01) | |
| *B62K 19/46* | (2006.01) | |
| *B60R 9/06* | (2006.01) | |
| *B62J 7/00* | (2006.01) | |
| *B60R 9/00* | (2006.01) | |
| *B60R 11/00* | (2006.01) | |

(52) U.S. Cl.
CPC ................ *B62K 3/002* (2013.01); *B62K 19/46* (2013.01); *B62J 7/00* (2013.01); *B60R 9/00* (2013.01); *B60R 9/06* (2013.01); *B60R 2011/004* (2013.01)
USPC .............. 280/87.05; 280/87.041; 280/87.021; 280/87.01; 296/37.4; 224/42.11

(58) Field of Classification Search
CPC ...... B62K 3/002; B62K 15/008; B62K 19/46; B62J 1/28; B62J 7/00; B62J 7/04; B62J 11/00; B60R 9/00; B60R 9/06; B60R 11/00; B60R 2011/004
USPC ................. 280/87.05, 87.01, 87.021, 87.041, 280/288.4, 293, 295, 298, 301, 304.5, 638, 280/35, 47.35; 296/37.1, 37.4, 37.5, 1.07; 224/400, 401, 497, 488, 511, 531, 224/42.11, 42.32–42.35
See application file for complete search history.

(56) References Cited

U.S. PATENT DOCUMENTS

| | | | | |
|---|---|---|---|---|
| 1,213,454 A | * | 1/1917 | Brown | ...................... 280/87.042 |
| 1,611,307 A | * | 12/1926 | Forse | ....................... 280/87.021 |

(Continued)

FOREIGN PATENT DOCUMENTS

| | | | |
|---|---|---|---|
| CA | 2317540 A1 | * | 2/2000 |
| DE | 19711042 A1 | | 9/1998 |

(Continued)

OTHER PUBLICATIONS

Invitation to pay Additional Fees and Partial International Search Report for Application No. PCT/US2013/069634, Mar. 18, 2014, 6 pages.

*Primary Examiner* — J. Allen Shriver, II
*Assistant Examiner* — Steve Clemmons
(74) *Attorney, Agent, or Firm* — Fredrikson & Byron, P.A.

(57) ABSTRACT

A scooter configurable into a stowed and an unstowed position includes an elongated deck support pivotally coupled at opposed ends to a steering assembly and to an elongated deck. In some embodiments, the scooter includes a cargo stand pivotally coupled to the elongated deck and configurable into a stowed and an unstowed position. The cargo stand is further configured for removably securing a cargo when in the unstowed position. In certain embodiments, the scooter includes a brake element pivotally coupled the elongated deck and spring biased away from a rear wheel of the scooter. Application of a force to the brake element hinders a rotation of the rear wheel by moving at least a portion of the brake element towards the rear wheel and removal of the force moves the brake element away from the rear wheel.

12 Claims, 12 Drawing Sheets

(56) References Cited

U.S. PATENT DOCUMENTS

| | | | | |
|---|---|---|---|---|
| 1,658,068 | A * | 2/1928 | White | 280/87.041 |
| 1,689,916 | A * | 10/1928 | Fisher | 280/87.041 |
| 1,707,831 | A * | 4/1929 | Wayerski | 280/87.041 |
| 2,180,143 | A * | 11/1939 | Fletcher | 280/87.041 |
| 3,901,534 | A * | 8/1975 | Popken | 280/304.4 |
| 4,103,924 | A * | 8/1978 | Suhm | 280/288.4 |
| 4,204,698 | A * | 5/1980 | Mihalik | 280/87.041 |
| 5,135,143 | A * | 8/1992 | Naughton | 224/416 |
| 5,265,695 | A * | 11/1993 | Piazzi | 180/208 |
| 5,407,222 | A * | 4/1995 | Harrison | 280/293 |
| 5,465,882 | A * | 11/1995 | Shinohara | 224/413 |
| 6,024,376 | A * | 2/2000 | Golichowski et al. | 280/655.1 |
| 6,053,339 | A * | 4/2000 | Bellis, Jr. | 211/70.6 |
| 6,173,976 | B1 | 1/2001 | Lee | |
| 6,352,270 | B1 | 3/2002 | Wu | |
| 6,406,042 | B1 | 6/2002 | Tsai | |
| 6,443,470 | B1 | 9/2002 | Ulrich et al. | |
| 6,450,517 | B1 | 9/2002 | Lee | |
| 6,481,728 | B2 | 11/2002 | Chen | |
| 6,520,516 | B2 * | 2/2003 | Favorito et al. | 280/87.042 |
| 6,616,154 | B1 | 9/2003 | Neuhold | |
| 6,874,802 | B2 * | 4/2005 | Gunter et al. | 280/288.4 |
| 6,966,471 | B1 * | 11/2005 | Wilson et al. | 224/413 |
| 6,991,243 | B2 * | 1/2006 | Boyle et al. | 280/87.05 |
| 7,077,229 | B2 * | 7/2006 | Lee | 180/220 |
| 7,134,677 | B2 | 11/2006 | Opsvik | |
| 7,588,257 | B2 * | 9/2009 | Gu | 280/79.11 |
| 8,282,109 | B1 * | 10/2012 | Arjomand et al. | 280/37 |
| 2002/0030339 | A1 * | 3/2002 | Powers | 280/87.041 |
| 2002/0105155 | A1 * | 8/2002 | Hou et al. | 280/47.4 |
| 2005/0057012 | A1 | 3/2005 | Boyle et al. | |
| 2005/0173175 | A1 * | 8/2005 | Lee | 180/208 |
| 2006/0196322 | A1 * | 9/2006 | Chuang | 81/177.85 |
| 2006/0244291 | A1 * | 11/2006 | Buell et al. | 297/215.12 |
| 2009/0194960 | A1 * | 8/2009 | Peterson | 280/87.041 |
| 2009/0289091 | A1 * | 11/2009 | Ulrich | 224/447 |
| 2012/0068433 | A1 * | 3/2012 | Eliasson | 280/221 |
| 2013/0153322 | A1 * | 6/2013 | Constin | 180/212 |

FOREIGN PATENT DOCUMENTS

| | | |
|---|---|---|
| WO | WO 0105646 A1 * | 1/2001 |
| WO | W003055737 A1 | 7/2003 |
| WO | WO 03055737 A1 * | 7/2003 |
| WO | W003093093 A1 | 11/2003 |

* cited by examiner

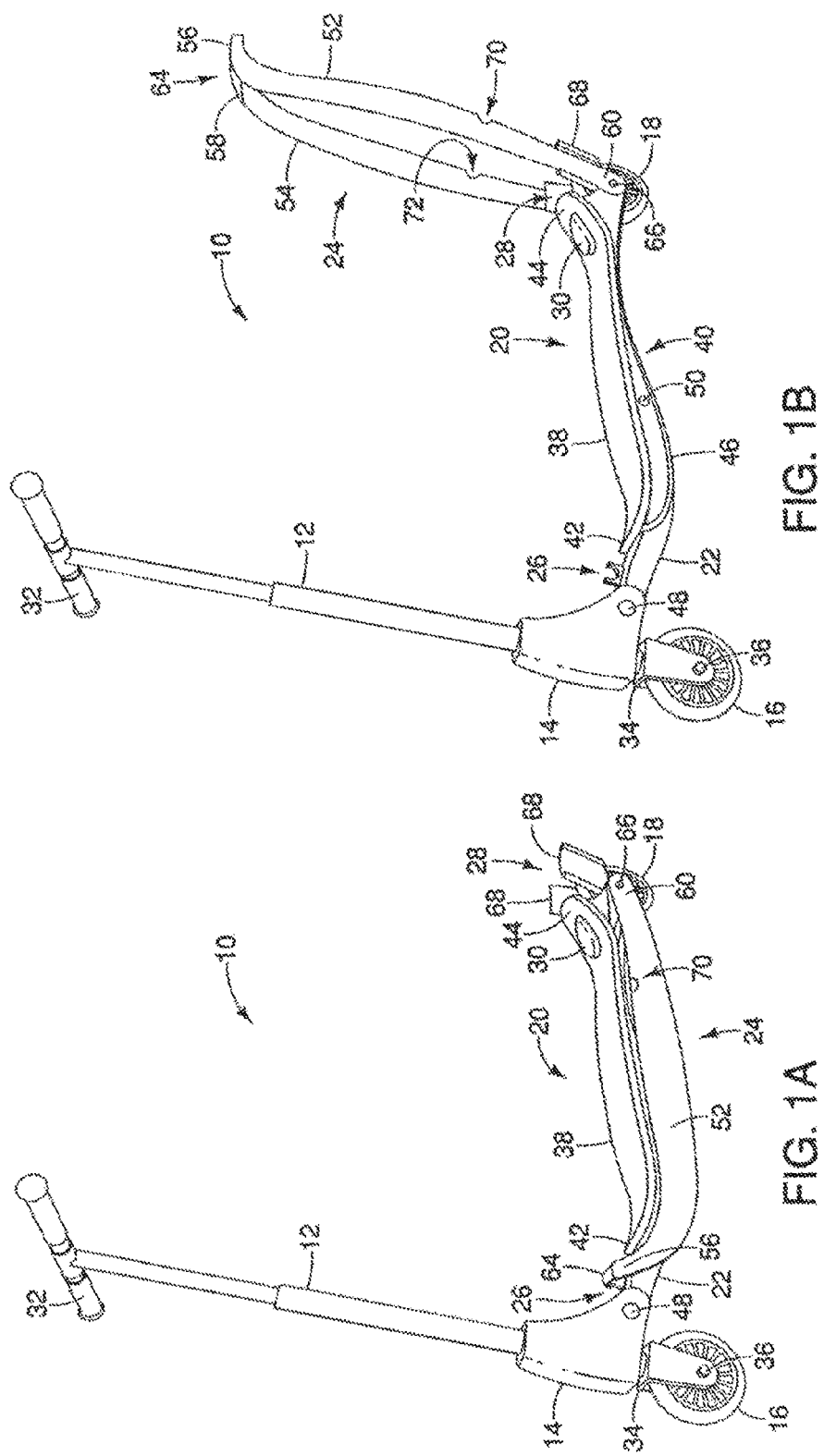

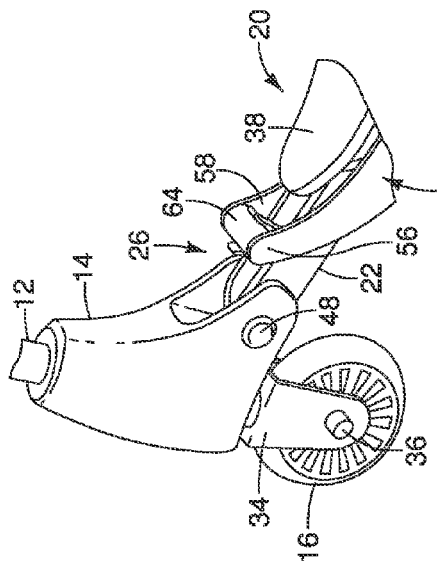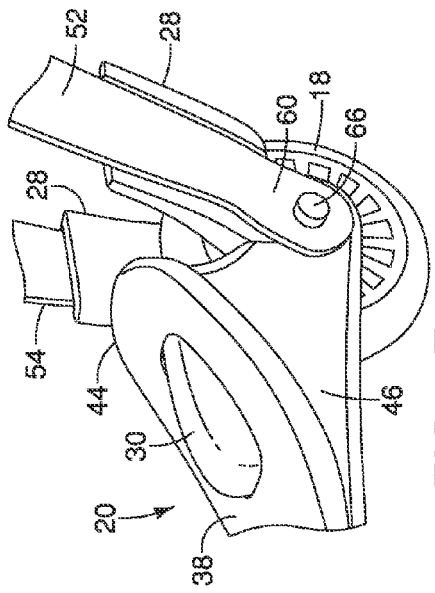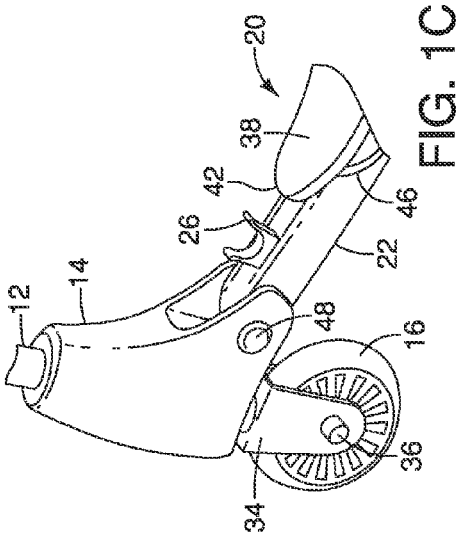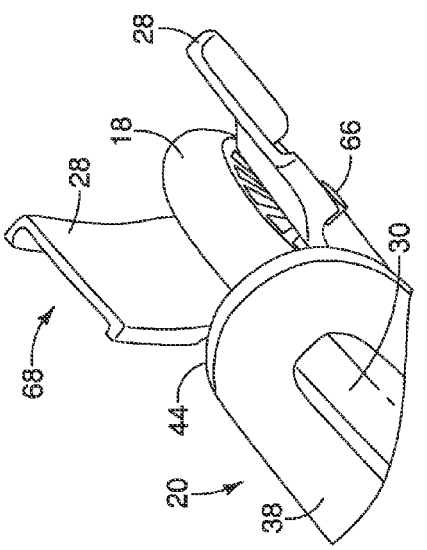

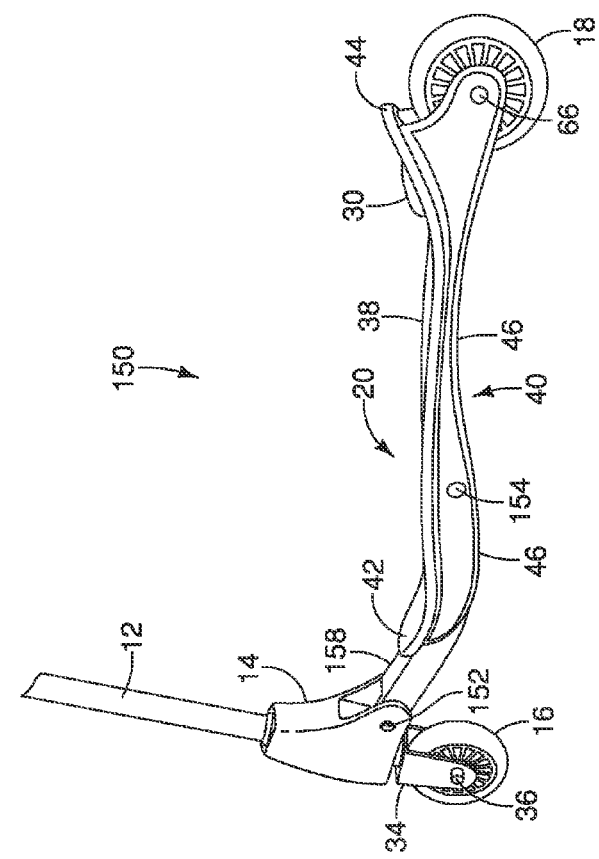
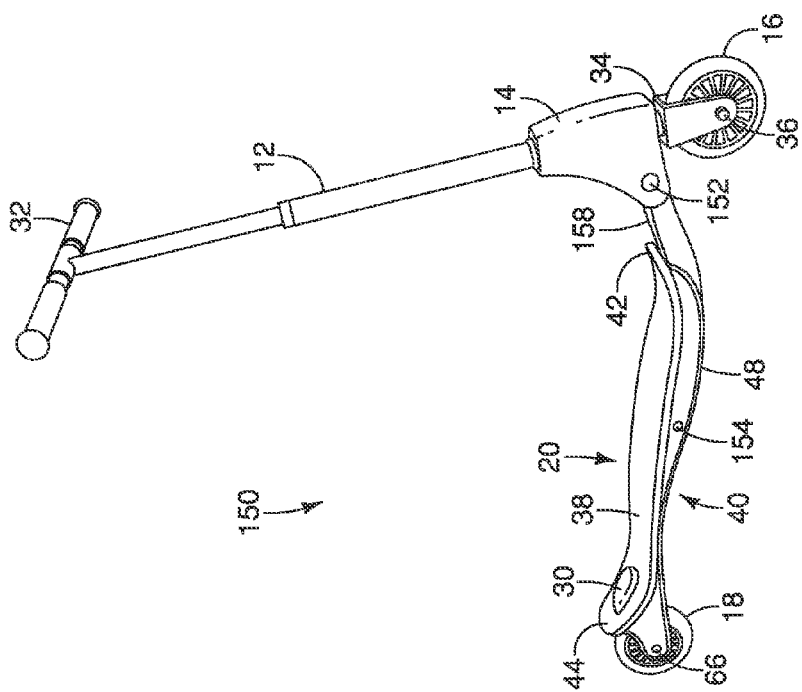

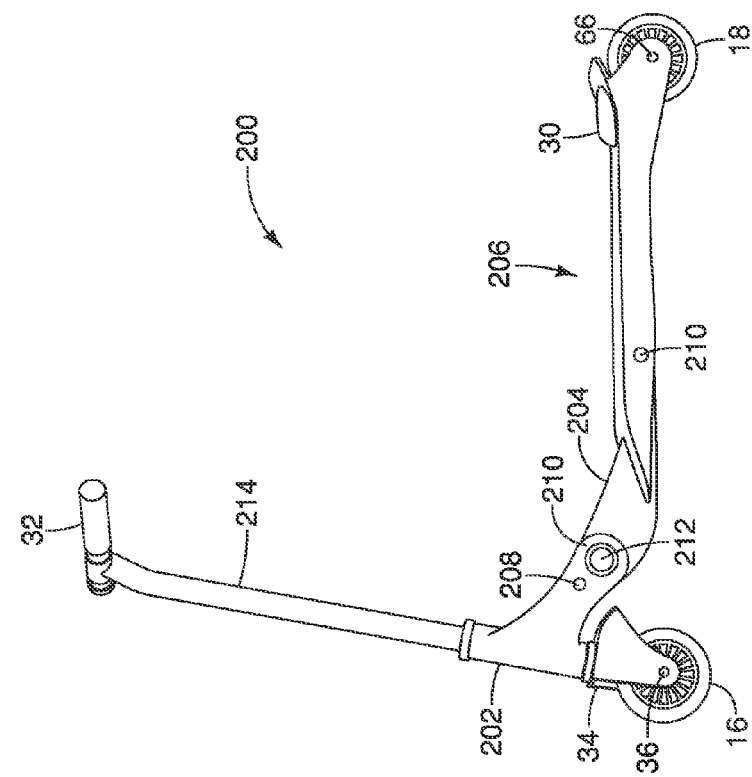
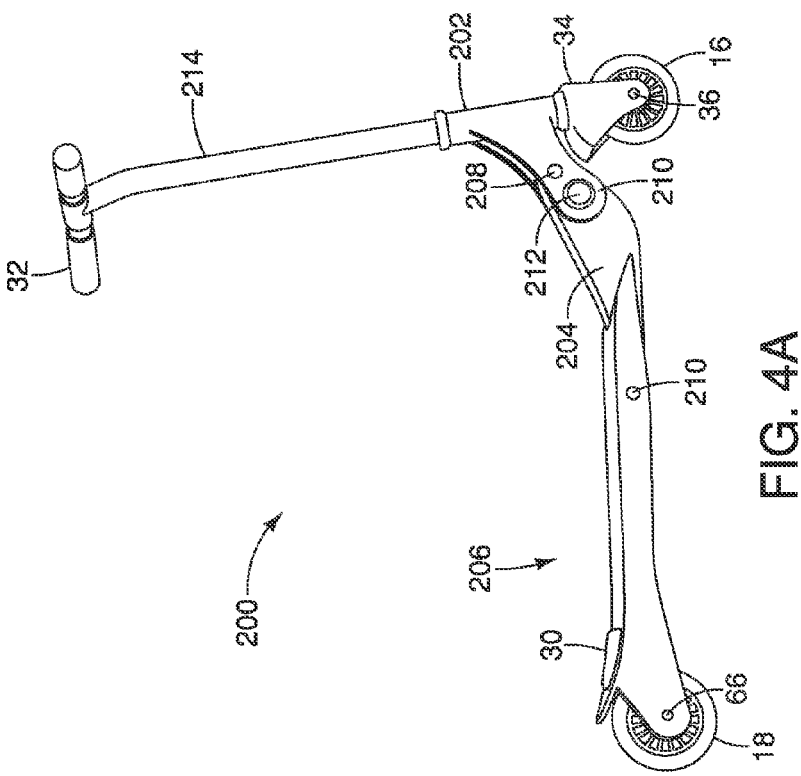

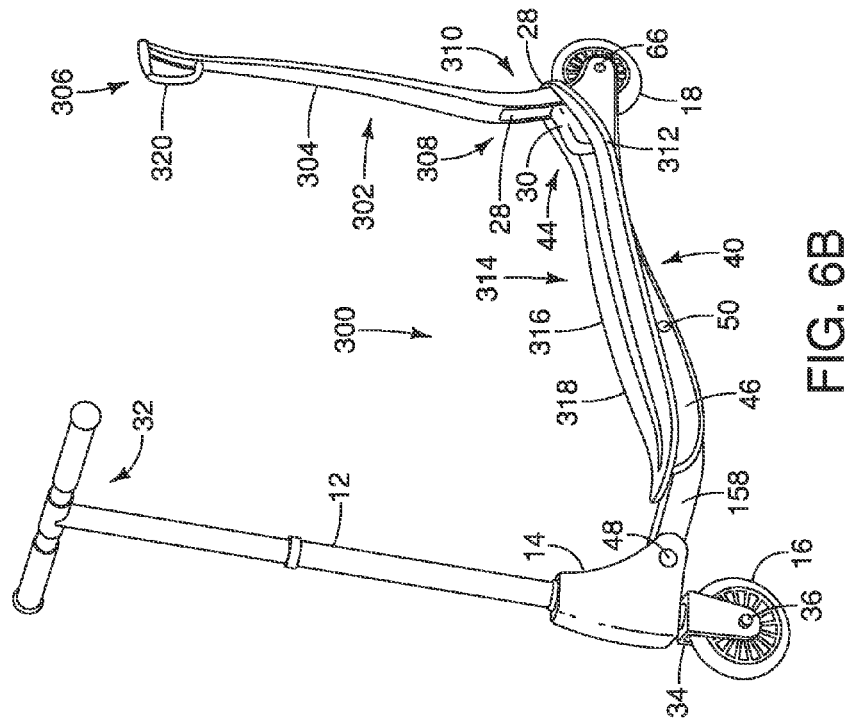
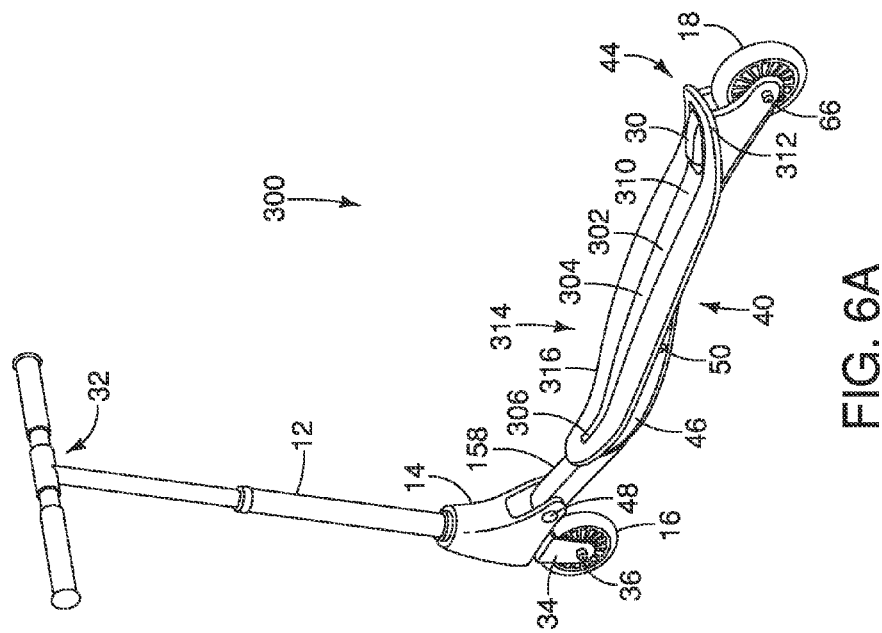

SCOOTER

TECHNICAL FIELD

The present disclosure relates to a scooter, also known as a kick scooter or push scooter. In particular, the disclosure pertains to a folding scooter collapsible onto itself, and a folding or collapsible scooter having a stowable stand for removably retaining a cargo.

BACKGROUND

Commercially available scooters provide a means of transportation for the operator of the scooter. Such scooters generally do not include a stand or a mounting rack for holding an object, for example a backpack. As such, any such object must be carried by the operator.

Accordingly, there exists a need for a scooter having a stowable stand or a mounting rack for holding objects such as a backpack while the operator is using the scooter. As such, the stowable stand must be operable between a stowed position when not in use and an unstowed position when in use.

SUMMARY

A non-limiting exemplary embodiment of a scooter includes a steering column extending between one or more handle bars and a front wheel fork, and a front wheel rotatably coupled to the front wheel fork. At least a portion of the steering column is rotatably coupled to the steering column support frame. The scooter includes a deck having a top surface, a bottom surface including a channel defined at least in part by opposed walls extending away from the bottom surface, a front section, and a rear section including a rear wheel fork defined at least in part by the opposed walls extending away from the bottom surface. A rear wheel axle rotatably couples a rear wheel to the rear wheel fork. The scooter also includes a stand defined at least in part by a pair of opposed frame members extending between respective first and second ends, wherein a spacer fixedly couples the first ends in a spaced apart relationship. The second ends of the stand are rotatably coupled to the rear wheel axle.

A deck support frame, having opposing ends, is rotatably coupled at one end to the steering column support frame, and at the opposite end to the deck. At least a portion of the deck support frame is receivable within at least a portion of the channel along the bottom surface of the deck. In some embodiments, the deck support frame is rotatably coupled to the opposed walls of the channel. In other embodiments, the steering column support frame and the deck support frame are rotatable relative to one another between a locking folded position and a locking unfolded position, and the deck and the deck support frame are rotatable relative to one another between a locking folded position and a locking unfolded position.

The deck support frame includes a first latching bracket for removably receiving and retaining the spacer at the first ends of the stand when the stand is in a stowed position. The scooter includes a pair of second latching brackets, wherein each one of the pair of second brackets is fixedly attached to a side of the rear wheel fork for removably receiving and retaining at least a portion of one of said pair of opposed frame members when the stand is in an unstowed position. As such, the stand and the deck are rotatable relative to one another such that the stand can be positioned at the stowed position or at the unstowed position.

A brake is rotatably coupled to the deck proximate the rear wheel, wherein at least a portion of the brake protrudes through an opening in the deck. The brake includes a first and a second arcuate wall wherein at least a portion of the first arcuate wall protrudes above the top surface of the deck and at least a portion of the second arcuate wall protrudes towards the rear wheel such that application of a pushing force on the first arcuate wall rotates the second arcuate wall towards the rear wheel and removal of the pushing force from the first arcuate wall rotates the second arcuate wall away from the rear wheel. Rotating the second arcuate wall towards the rear wheel frictionally couples the second arcuate wall to the rear wheel for stopping rotation of the rear wheel by decreasing a rotational velocity of the rear wheel.

The opposed frame members, in a non-limiting exemplary embodiment of the stand, include indentations at predetermined locations on the frame members for receiving and retaining at least a portion of an object latched to the spacer.

In some non-limiting exemplary embodiments, the stand is defined at least in part by an elongated member extending between a first end and a securement fork at a second end opposite the first end, wherein at least a portion of the securement fork extends through an opening in a rear section of the deck and is rotatably coupled to the rear wheel axle. In some such embodiments, the scooter includes a longitudinally extending groove in the top surface of the deck for removably receiving and retaining the stand in the stowed position. As such, the scooter does not include the first latching bracket in the deck support frame. In certain embodiments, the first end of the scooter includes a carabiner for removably receiving and retaining at least a portion of an object, for example a backpack, while the stand is in the unstowed position.

In an alternate embodiment, the scooter does not include a stand.

In accordance with a non-limiting exemplary embodiment, a method of using a scooter includes providing a stand extending between a first end and a second end, wherein the second end is rotatably coupled to a rear wheel axle of a rear wheel of the scooter, providing a first latching bracket on the scooter for removably receiving and retaining the first end of the stand in a stowed position on the scooter, and providing a pair of second latching brackets for removably receiving and retaining the stand in an unstowed position wherein the pair of second latching brackets are fixedly attached to at least a portion of the scooter proximate the rear wheel and configured for receiving at least a portion of the stand. The stand is unlatched from the first latching bracket and is rotated about the rear wheel axle from the stowed position to the unstowed position. The stand is then placed in the unstowed position by latching the stand to the pair of second latching brackets. The stand is placed in the stowed position by unlatching the stand from the pair of second latching brackets, rotating the stand about the rear wheel axle from the unstowed position to the stowed position, and placing the stand in the stowed position by latching the stand to the first latching bracket.

In some embodiments, the scooter includes a longitudinally extending groove in the top surface of the deck for removably receiving and retaining the stand in the stowed position. As such, the scooter does not include the first latching bracket in the deck support frame.

In some embodiments of the scooter, the stand includes one or more indentations. After the stand has been placed in the unstowed position, a first section of a backpack is removably attached to the first end of the stand and a second section of the backpack is removably attached to the one or more indentations. The backpack is removed from the stand by detaching the second section of the backpack from the one or more indentations, and detaching the first section of the backpack from the first end of the stand.

BRIEF DESCRIPTION OF THE DRAWINGS

FIG. 1A is a perspective view of an embodiment of a scooter with a backpack stand in a stowed position;

FIG. 1B is a perspective view of the of scooter of FIG. 1A with the backpack stand in an unstowed position;

FIG. 1C is a close-up partial perspective view of the scooter of FIG. 1B illustrating an embodiment of a first latching bracket for the backpack stand;

FIG. 1D illustrates a portion of the backpack stand engaged in the first latching bracket of FIG. 1C;

FIG. 1E is a close-up partial perspective view of the scooter of FIG. 1A illustrating an embodiment of a second latching bracket for the backpack stand;

FIG. 1F illustrates a portion of the backpack stand engaged in the second latching bracket of FIG. 1E;

FIG. 3A is a perspective view of an alternate embodiment of a scooter;

FIG. 3B is a partial perspective of the scooter of FIG. 3A;

FIG. 4A is a perspective view of an alternate embodiment of a scooter;

FIG. 4B is another perspective of the scooter of FIG. 4A;

FIG. 6A is a perspective view of an embodiment of a scooter with a backpack stand in a stowed position;

FIG. 6B is a perspective view of the of scooter of FIG. 6A with the backpack stand in an unstowed position.

DETAILED DESCRIPTION

While multiple embodiments are disclosed herein, still others may become apparent to one skilled in the art. In the following, certain illustrative and non-limiting embodiments are described in detail with reference to the accompanying drawings wherein like elements are designated by like numerals. It should be clearly understood that there is no intent, implied or otherwise, to limit the invention in any form or manner to that illustrated and described herein. All alternative embodiments are considered as being within the metes and bounds of the instant invention as defined by the appended claims and any and all equivalents thereof.

Figure 1G:
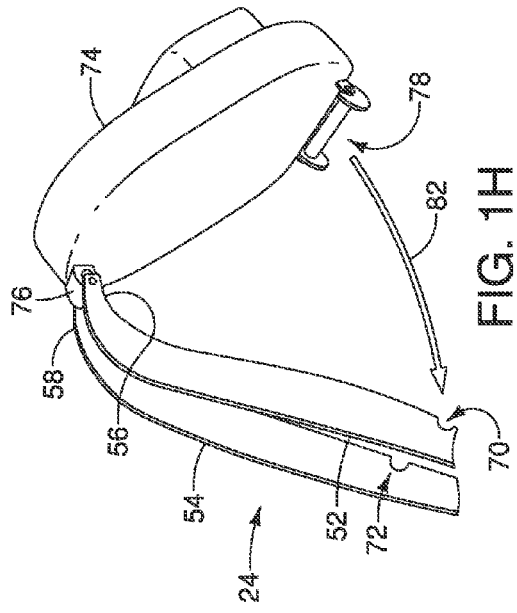
FIG. 1G illustrates securing an upper portion of a backpack to the backpack stand of FIG. 1B.

FIGS. 1A and 1B are perspective views of scooter 10 in accordance with an embodiment of the present invention. Scooter 10 includes elongated steering column 12, steering column support frame 14, front and rear wheels 16 and 18, respectively, deck 20, deck support frame 22, backpack stand 24, first latching bracket 26 and pair of second latching brackets 28 for backpack stand 24, and brake 30. Steering column 12 extends longitudinally between handlebar 32 and fork 34. Front wheel axle 36 rotatably couples front wheel 16 and fork 34 in a configuration enabling rotational movement of front wheel 16 about axle 36. In some embodiments of scooter 10, steering column 12 is a telescoping column configured for changing a distance between handlebar 32 and fork 34 (or front wheel 16). As such, steering column 12 is extendible and collapsible for accommodating users of different height, and it can also be collapsed into itself when not in use. As illustrated, at least a portion of steering column 12 proximal of fork 34 extends through steering column support frame 14 to which it is rotatably coupled. In some embodiments of scooter 10, steering column support frame 14 is configured for enabling unrestricted rotational movement, i.e., 360° rotation, of steering column 12. In other embodiments of scooter 10, steering column support frame 14 is configured to limit or restrict the rotational movement of steering column 12 to less than 360°. In certain embodiments of scooter 10, steering column support frame 14 is configured for inhibiting longitudinal movement of steering column 12 therethrough at least while scooter 10 is in use. In some embodiments, for the sake of convenience, steering column 12, steering column support frame 14, front wheel 16, one or more handle bars 32, fork 34, and front when axle 36 are collectively referred to as a steering assembly.

Deck 20 includes top and bottom surfaces 38 and 40, respectively. Top surface 38 is configured for a user to stand on with one or both feet. Bottom surface 40 includes a longitudinally extending channel or open-ended trough (not shown) extending between front and rear sections 42 and 44, respectively, of deck 20. In an embodiment of scooter 10, the trough or channel is defined at least partially by a pair of opposed walls 46 (only one shown) extending away from bottom surface 40, and is at least partially configured for receiving at least a portion of deck support frame 22. Coupling 48 attaches together one end of deck support frame 22 and steering column support frame 14. At least a portion of deck support frame 22 extending proximally from steering column support frame 14 is received within, and extends along, at least a portion of the channel on bottom surface 40 of deck 20. Coupling 50 attaches together deck support frame 22 and the pair of opposed walls 46. As can be seen, at least a portion of front section 42 of deck 20 is at least partially supported by or rests on at least a portion of deck support frame 22.

Backpack stand 24, in an embodiment of scooter 10, includes a pair of opposed elongated frame members 52 and 54, each respectively having first end 56 and 58 and second end 60 and 62. First ends 56 and 58 are coupled to one another in a spaced apart relationship. In some embodiments of backpack stand 24, first ends 56 and 58 are fixedly attached to opposing ends of spacer 64 extending therebetween. Turning first to FIGS. 1C and 1D, deck support frame 22, in an embodiment of scooter 10, includes first latching bracket 26 configured for removably receiving and retaining (e.g., securing, engaging) spacer 64 when backpack stand 24 is in a stowed position. In a non-limiting exemplary embodiment of scooter 10, such as that illustrated in FIGS. 1C and 1D, first latching bracket 26 is a clip.

Turning now to FIGS. 1A, 1B, 1E and 1F, rear wheel axle 66 is illustrated coupling together several components of scooter 10 at rear section 44 of deck 20. In a non-limiting exemplary embodiment of scooter 10, moving outwards in either direction from rear wheel 18, these components include second latching brackets 28, opposing sides 47 (only one shown) of a rear wheel fork defined at least in part by opposed walls 46 of deck 20, and second ends 60 and 62 of respective frame members 52 and 54 of backpack stand 24. Rear wheel 18 is coupled in a configuration enabling rotational movement thereof about rear wheel axle 66. Each second latching bracket 28 includes shallow channel or trough 68 configured for removably receiving and retaining (e.g., securing, engaging), when backpack stand 24 is in an unstowed (e.g., an extended) position, at least a portion of each frame member 52/54. Second ends 60 and 62 of respective frame members 52 and 54 of backpack stand 24 are coupled in a configuration enabling rotational movement of frame members 52 and 54 about rear wheel axle 66. It should be understood that the illustrated configuration or order in which the components are coupled is only for the purpose of describing a non-limiting exemplary embodiment of scooter 10. For instance, second latching brackets 28 are illustrated with their respective shallow channels 68 facing outwards in opposite directions and away from rear wheel 18. Additionally, the rotatably coupled frame members 52 and 54 are illustrated facing or on the same side as the shallow channels of second latching brackets 28. As such, frame members 52 and 54 will be received within and removably secured or engaged in shallow channels 68 when backpack stand 24 is rotated from a stowed position to an unstowed position. Alternate configurations for the one or more components and/or the order in which they are arranged and coupled will become apparent to one skilled in the art. All such alternate embodiments are considered as being within the metes and bounds of the instant invention.

Figure 1H:
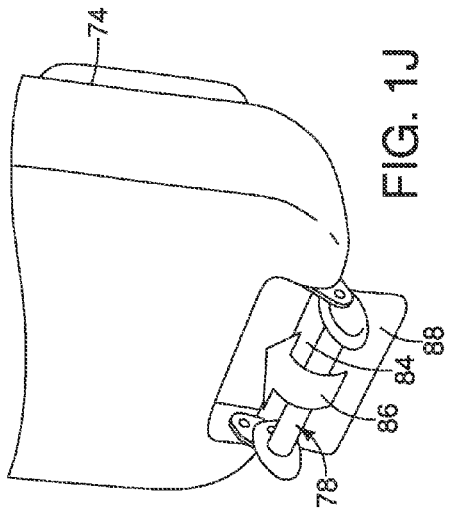
FIG. 1H illustrates securing a lower portion of the backpack of FIG. 1G to the backpack stand of FIG. 1B.

In a non-limiting exemplary embodiment of scooter 10, backpack stand 24 includes indentations 70 and 72, respectively, on at least a portion of frame members 52 and 54. As perhaps best illustrated with reference to FIGS. 1G-1I, indentations 70 and 72 in combination with spacer 64 are configured for receiving and retaining at least a portion of backpack 74. Backpack 74, in a non-limiting exemplary embodiment, includes latching hook 76 and latching bar 78 for removably affixing or securing backpack 74 to backpack stand 24 of scooter 10. As described herein below with reference to an embodiment for a method of use, spacer 64, indentations 70 and 72, latching hook 76 and latching bar 78 are used in combination for removably attaching or securing backpack 74 to scooter 10.

Figure 1I:
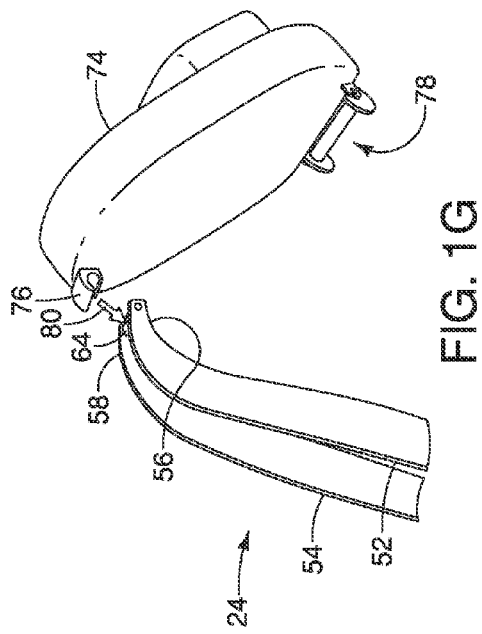
FIG. 1I is a perspective view of the scooter of FIG. 1B with the backpack removably secured to the backpack stand.

A non-limiting exemplary embodiment of a method of using scooter 10 includes one or more of the following steps starting from backpack stand 24 in a stowed position with spacer 64 engaged in first latching bracket 26. Spacer 64, to which first ends 56 and 58 frame members 52 and 54 are fixedly attached, is disengaged from first latching bracket 26 and lifted away from deck 20 of scooter 10. Accordingly, frame members 52 and 54 will rotate about rear wheel axle 66 to which second ends 60 and 62 are rotatably coupled. The lifting of spacer 64 and rotation of frame members 52 and 54 is continued until at least portions thereof are received and engaged within shallow channel 68 of each second latching bracket 28. Backpack stand 24 is now considered ready for use and backpack 74 is removably attached to spacer 64 and indentations 70 and 72. As shown by the direction of arrow 80, latching hook or clip 76 is placed on or positioned over spacer 64 and rotatably hooked or clipped thereto such that spacer 64 provides a pivoting configuration about which backpack 74 can be rotated. Next, latching bar 78 is removably secured (or latched or clipped) within indentations 70 and 72 in respective frame members 52 and 54 by swinging the bottom of backpack 74, to which latching bar 78 is fixedly attached, towards backpack stand 24 in the direction indicated by arrow 82. As illustrated in FIG. 1I, scooter 10 having backpack 74 attached thereto is ready for use.

Figure 1J:
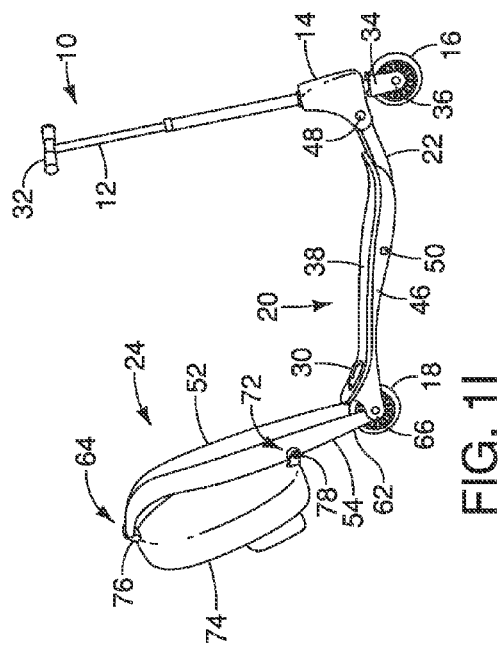
FIG. 1J is a partial perspective view of the lower portion of the backpack.

It will be apparent that the process is reversed for detaching backpack 74 from scooter 10. In a non-limiting exemplary embodiment, latching bar 78 is rotatably attached to backpack 74 which includes storage compartment 84 for at least partially stowing latching bar 78 after backpack 74 has been detached from backpack stand 24 of scooter 10. As illustrated in FIG. 1J, at least a portion of latching bar 78 can be stowed within storage compartment 84 by moving it in the direction indicated by arrow 86. Flap 88 can then be used to cover up latching bar 78 stowed within storage compartment 84. After backpack 74 has been separated from scooter 10, backpack stand 24 can be returned to the stowed position by reversing the order of the steps for extending or opening backpack stand 24.

In a non-limiting exemplary embodiment, latching hook or clip 76 may be configured as a telescoping (or extendible) handle which can be extended when attached to and/or when detached from backpack stand 24. Because the distance between spacer 64 (or first ends 56 and 58) and indentations 70 and 72 is essentially fixed by design or manufacture, a telescoping latching hook 76 enables attaching backpacks of different sizes (or heights) to scooter 10. For instance, latching hook 76 can be extended towards or away from backpack 74 such that the distance between latching hook 76 and latching bar 78 is appropriate for attaching or securing backpack 74 to spacer 64 and indentations 70 and 72 of scooter 10. In certain embodiments, latching bar 78 includes one or more rotatably mounted wheels configured for rolling backpack 74 along a surface. For instance, after backpack 74 has been detached from scooter 10, latching hook 76 can be extended away from (or towards) backpack 74 and the one or more wheels of latching bar 78 can be used for rolling, e.g., pulling and/or pushing, backpack 74.

Figure 2C:
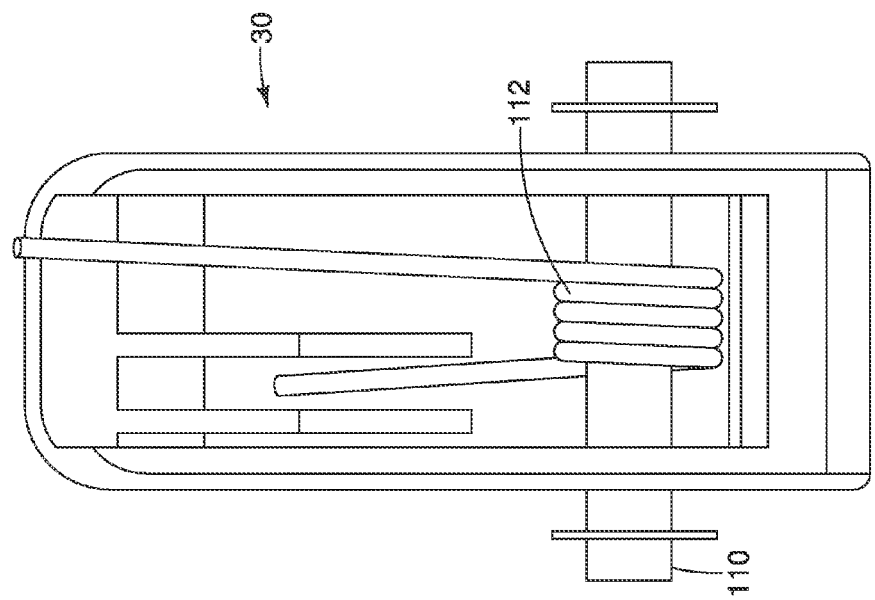
FIG. 2C is partial internal bottom view of the brake of FIG. 2A.
Figure 2A:
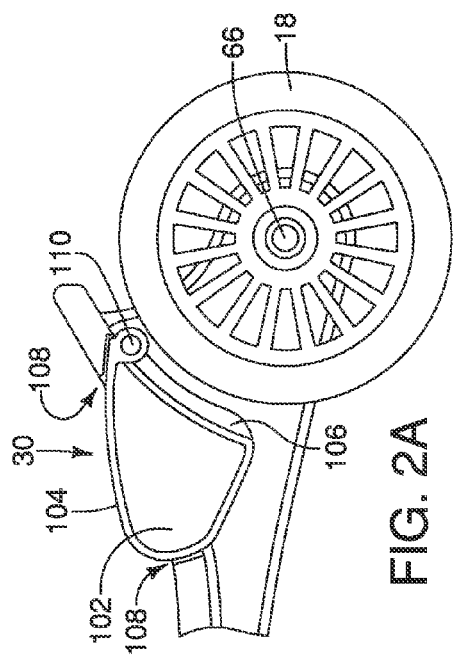
FIG. 2A is a side view of an embodiment of a brake in a disengaged position.
Figure 2B:
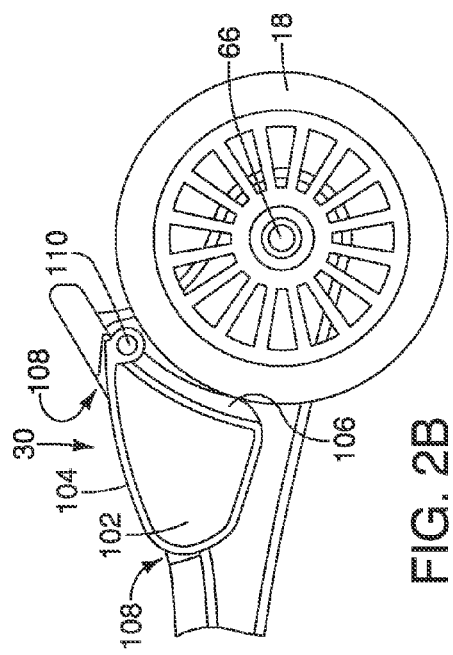
FIG. 2B is a side view of the brake of FIG. 2A in an engaged position.

FIG. 2A illustrates an embodiment of brake 30 in a disengaged position over rear wheel 18, and FIG. 2B illustrates brake 30 engaging rear wheel 18. Brake 30 includes a pair of opposed side walls 102 (only one shown) extending between top and bottom arcuate walls 104 and 106. At least a portion of top arcuate wall 104 extends through opening 108 in at least a portion of rear section 44 of deck 20. Brake 30 is positioned over at least a portion of rear wheel 18 and is coupled to deck 20 by coupling 110. In a non-limiting exemplary embodiment, such as that illustrated in FIG. 2C, brake 30 includes one or more spring-biased mechanisms 112 configured for retaining brake 30 in the disengaged position while not in use as shown in FIG. 2A. During normal operation, brake 30 is in a disengaged position and bottom arcuate wall 106 does not contact rear wheel 18. When brake 30 is used, for example while rear wheel 18 is rotating, pressure is applied on top arcuate wall 104 whereby bottom arcuate wall 106 moves towards, and contacts, rear wheel 18. Bottom arcuate wall 106 engages or applies pressure on rear wheel 18 to inhibit or stop its rotational movement. When the pressure applied on top arcuate wall 104 is removed, bottom arcuate wall 106 moves away from rear wheel 18, thereby disengaging brake 30. Accordingly, in certain non-limiting exemplary embodiments, one or more spring-biased mechanisms 112 for brake 30 includes one or more torsion springs, one or more compression springs, one or more expansion springs, one or more pairs of opposed levers, or any other spring-biased mechanism configured for retaining brake 30 away from rear wheel 18 in the absence of external forces on any portion of brake 30.

Figure 3C:
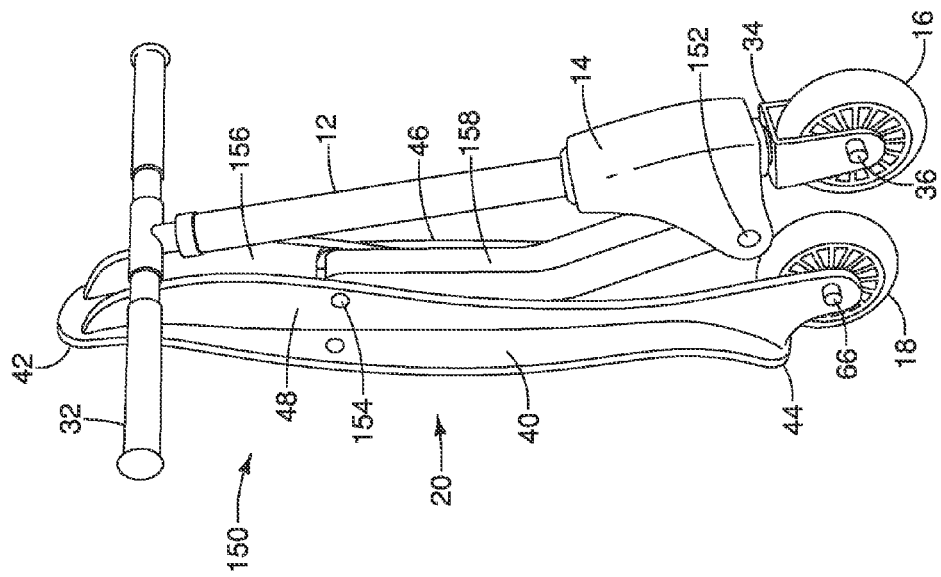
FIG. 3C is a perspective view of the scooter of FIG. 3A in a collapsed position.
Figure 3D:
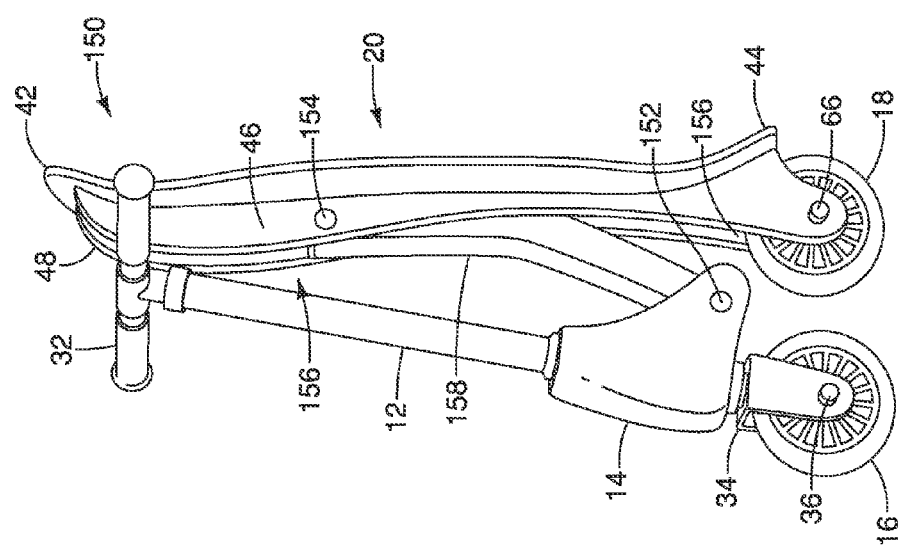
FIG. 3D is another perspective view of the scooter of FIG. 3C.

FIGS. 3A and 3B are perspective views of an embodiment of scooter 150 illustrated in an extended or open or unfolded position such as when in use, and FIGS. 3C and 3D are perspective views of scooter 150 in a collapsed or folded position such as when not in use. While the shapes of some components or elements differ somewhat, several aspects of scooters 10 and 150 are similar. Accordingly, like numerals reference like elements. As can be seen, scooter 150, in contrast to scooter 10, does not include backpack stand 24, and therefore also does not include first and second latching brackets 26 and 28. Also as can be seen, scooter 150 is configured for being folded or collapsed when not in use. This functionality is enabled by using couplings 152 and 154, respectively, instead of couplings 48 and 50 of scooter 10. In accordance with an embodiment of the invention, couplings 152 and 154 each include one or more locking or latching mechanism configured for retaining scooter 150 in the extended (open or unfolded) or collapsed (folded) position. The mechanism must then be unlocked or unlatched for changing the configuration of scooter 150. For instance, coupling 152 is configured such that by rotating steering column support frame 14 and deck support frame 158 apart or away from each other, the locking or latching mechanism is activating when they reach a predetermined position relative to one another. The locking or latching mechanism must then be deactivated for rotation in the opposite direction. This can be accomplished, for instance, by pushing in the ends of the coupling towards one another while rotating steering column support frame 14 and deck support frame 158 towards one another. Coupling 154 is similarly configured. FIGS. 3C and 3D also partially illustrate channel or open-ended trough 156 on bottom surface 40 under deck 20. As previously described in reference to FIGS. 1A and 1B, trough 156 extends longitudinally between front and rear section 42 and 44, respectively, of deck 20 and is at least partially defined by a pair of opposed walls 46 extending away from bottom surface 40. Channel or open-ended trough 156 is at least partially configured for receiving at least a portion of deck support frame 158.

Figure 4C:
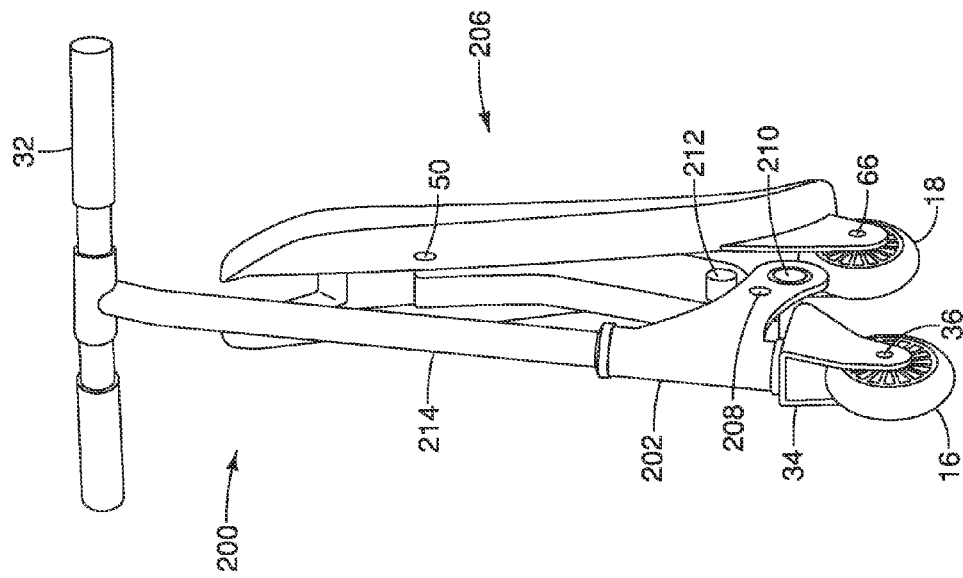
FIG. 4C is a perspective view of the scooter of FIG. 4A in a collapsed position.
Figure 4D:
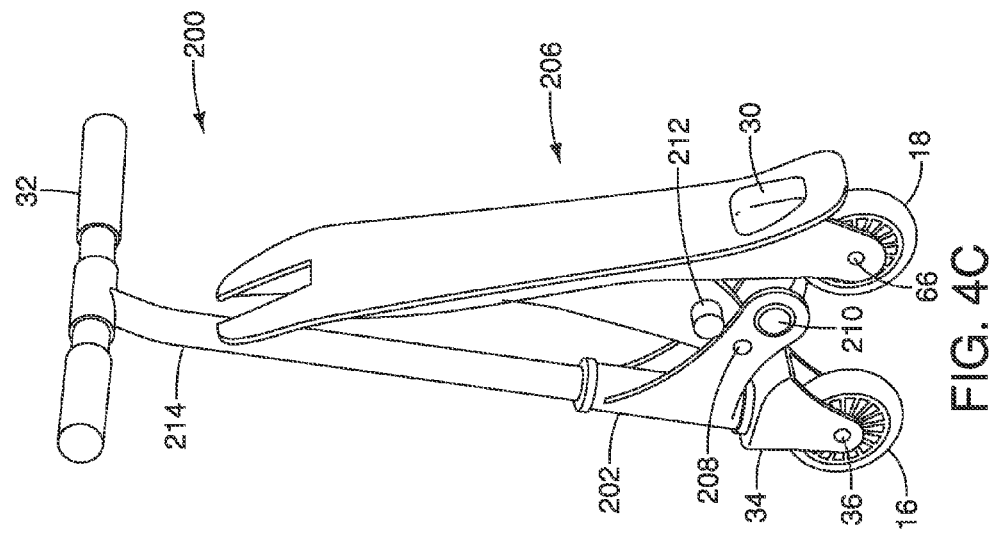
FIG. 4D is another perspective view of the scooter of FIG. 4C.

FIGS. 4A and 4B are perspective views of an embodiment of scooter 200 illustrated in an extended or open or unfolded position such as when in use, and FIGS. 4C and 4D are perspective views of scooter 200 in a collapsed or folded position such as when not in use. Again, while the shapes of some components or elements differ somewhat, several aspects of scooters 10, 150 and 200 are similar. Accordingly, like numerals reference like elements. For instance, scooters 10, 150 and 200 include the same or similar handlebar 32, front and rear wheels 16 and 18, etc. However, as illustrated, the following components of scooter 200 differ somewhat from the corresponding components in scooter 10 and/or scooter 150: steering column support frame 202, deck support frame 204, deck 206, coupling 208, and steering column 214. In contrast to couplings 48 and 152, at least coupling 208 is different in that it is a pivoting point and not a locking or latching coupling such as couplings 48 and 152. In scooter 200, the locking or latching functionality for steering column support frame 202 and deck support frame 204 is configured as a spring-loaded latch including receptacle 210 and pin 212. As illustrated, coupling 212 rests within receptacle 210 when scooter 200 is in the open or unfolded position. Accordingly, when folding scooter 200, coupling 212 is retracted from receptacle 210 while steering column support frame 202 and deck support frame 204 are rotated towards one another.

Figure 5A:
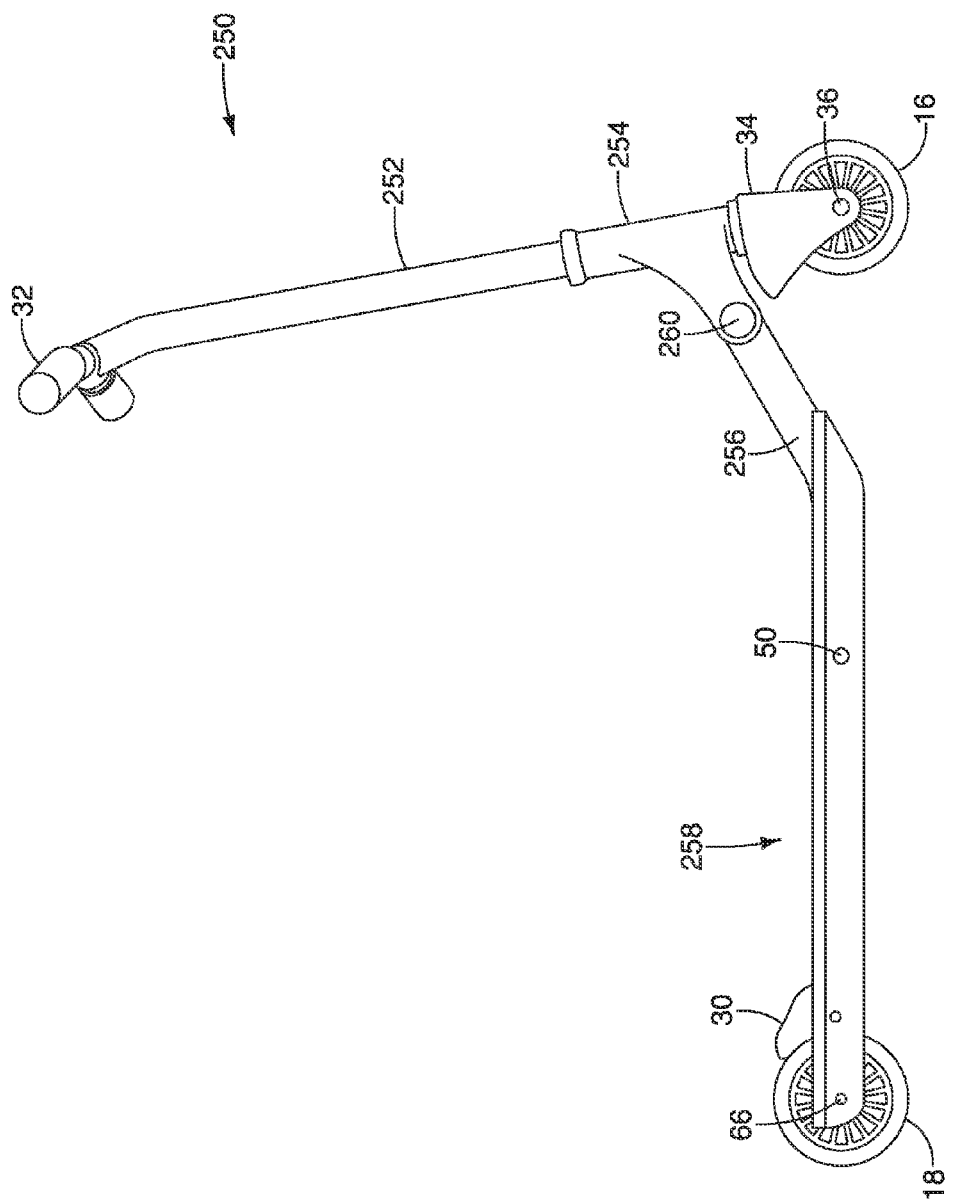
FIG. 5A is a side view of another embodiment of a scooter.
Figure 5C:
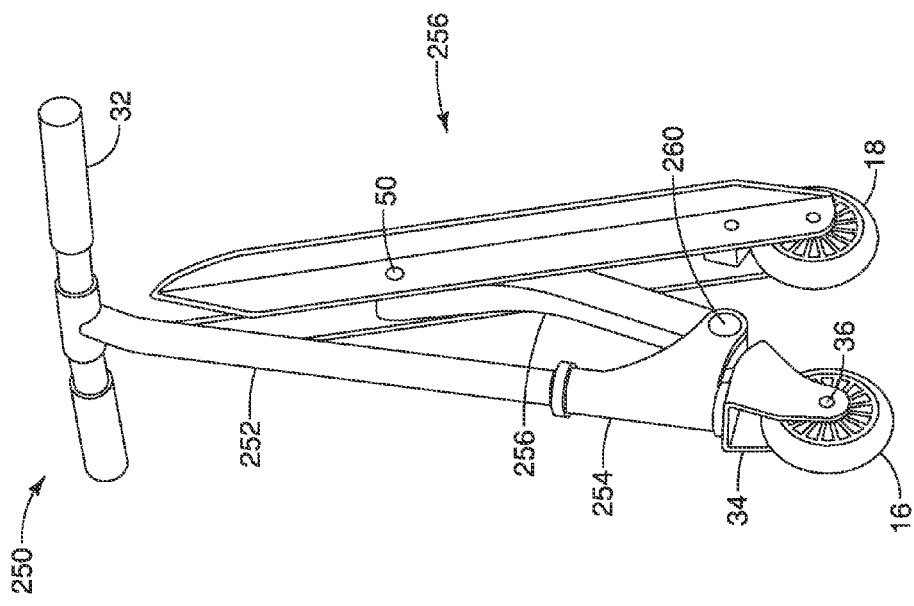
FIG. 5C is another perspective view of the scooter of FIG. 5B.
Figure 5B:
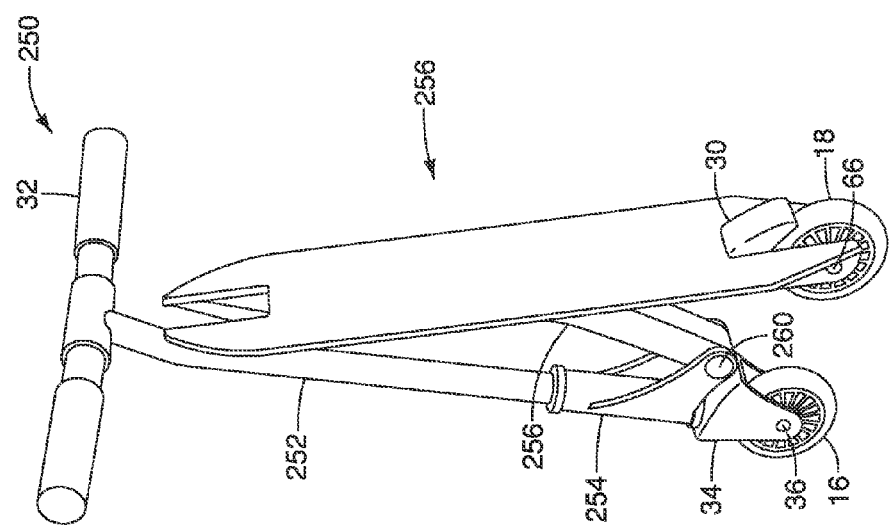
FIG. 5B is a perspective view of the scooter of FIG. 5A in a collapsed position.

FIG. 5A is a side view of another embodiment of scooter 250 illustrated in an extended or open or unfolded position such as when in use, and FIGS. 5B and 5C are perspective views of scooter 250 in a collapsed or folded position such as when not in use. Again, while the shapes of some components or elements differ somewhat, several aspects of scooters 10, 150, 200 and 250 are similar. Accordingly, like numerals reference like elements. For instance, all embodiments of the scooter include the same or similar handlebar 32, front and rear wheels 16 and 18, etc. However, as illustrated, the following components of scooter 250 differ somewhat from the corresponding components in other embodiments of the scooter: steering column 252, steering column support frame 254, deck support frame 256, deck 258, and coupling 260. While coupling 260 appears different from coupling 48, it is configured to function in substantially the same manner, i.e., coupling 260 also includes a locking or latching mechanism the same as or similar to that of coupling 48.

Figure 6C:
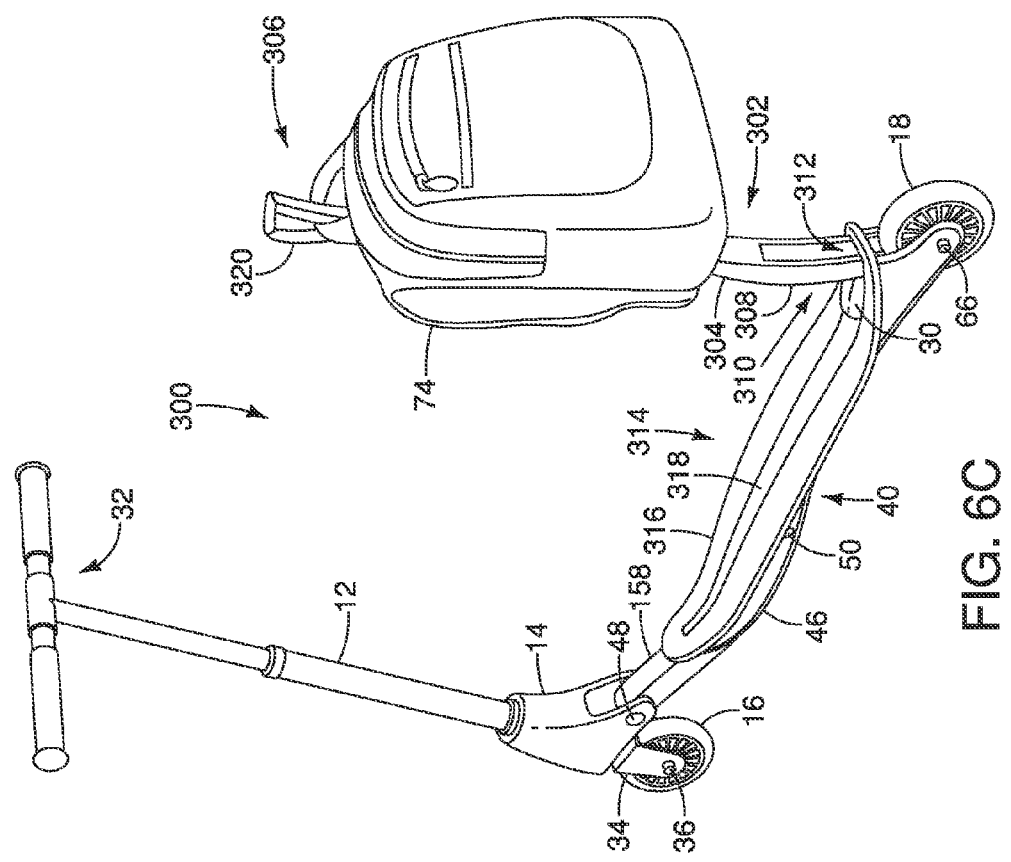
FIG. 6C is a perspective view of the of scooter of FIG. 6B with a backpack.

FIGS. 6A and 6B, respectively, are perspective views of an embodiment of scooter 300 with backpack stand 302 in a stowed position and an unstowed position. In contrast to backpack stand 24, backpack stand 302 is defined at least in part by elongated member 304 extending between first end 306 and securement fork 308 at second end 310 opposite first end 306. As illustrated, at least a portion of securement fork 308 extends through opening 312 in rear section 44 of deck 314 and is rotatably coupled to rear wheel axle 66. Top surface 316 of deck 314 includes longitudinally extending groove 318 configured, at least in part, for removably receiving and retaining backpack stand 302 in the stowed position. As illustrated in FIGS. 6B and 6C, first end 306 of backpack stand 302 includes carabiner 320 for removably receiving and retaining at least a portion of backpack 74.

In view of the incorporated illustrations and description of certain non-limiting exemplary embodiments of the instant invention, various modifications thereof and/or alternate embodiments may become apparent without departing from the spirit, scope and intent of the invention. For instance, while the illustrated and/or described embodiments refer to particular features and/or functions, the invention is considered to also include embodiments having combinations of features and/or functions different from those described. Accordingly, the scope and intent of the invention is intended to embrace all alternatives, modifications, variations, etc., as may become apparent to one skilled in the art.

What is claimed is:

1. A scooter, comprising
   a steering assembly comprising
      a front wheel rotatably coupled to a front wheel axle; and
      one or more handle bars configured for steering said front wheel;
   an elongated deck comprising a front section and a rear section, said rear section including a rear wheel rotatably coupled to a rear wheel axle; and
   an elongated deck support comprising opposed first and second ends, wherein
      said first end and said steering assembly are pivotally coupled about a first pivot axis; and
      said second end and said elongated deck are pivotally coupled about a second pivot axis at an intermediate position along a length of said deck between said front and said rear sections thereof;
   wherein
      said first and said second pivot axes are substantially parallel to an axis of rotation of said rear wheel; and
      said scooter is configurable into a stowed and an unstowed position by relative rotations of said steering assembly, said elongated deck, and said elongated deck support about respective said first and said second pivot axes such that in said stowed position, said front and said rear wheels are in proximity of one another and at least a portion of said front section of said deck and at least a portion of said one or more handle bars are in proximity of one another;

in said unstowed position, said front section of said elongated deck forward of said intermediate position abuts at least a portion of a top surface of said elongated deck support inhibiting further rotation of said elongated deck when a force is applied on at least a portion of a top surface of said elongated deck;

an elongated cargo stand configured for attaching a cargo thereto, said cargo stand comprising opposed first and second ends, said second end pivotally coupled to said elongated deck for rotation about a second axis of rotation, said second axis of rotation being parallel to a first axis of rotation about which said rear wheel rotates; and an intermediate section between said first and said second ends;

wherein, said cargo stand is configurable into a stowed and an unstowed position by rotating said first end about said second axis of rotation such that in said stowed position, said first end rotates towards said elongated deck support and said intermediate section of said stand is flush with at least said top surface of said elongated deck; and in said unstowed position, said first end rotates away from said elongated deck support and said cargo stand is approximately orthogonal relative to said top surface of said elongated deck.

2. The scooter of claim 1, wherein said deck support comprises a first latching bracket for removably receiving and retaining at least a portion of said first end of said cargo stand when said cargo stand is in said stowed position and inhibiting said first end from moving below a bottom surface of said deck support; and said elongated deck comprises a pair of second latching brackets for removably receiving and retaining at least a portion of said second end of said cargo stand when said cargo stand is in said unstowed position.

3. The scooter of claim 1 wherein said elongated deck comprises a longitudinally extending groove in said top surface of said deck, said grove configured for removably receiving and retaining therewithin at least said first end and said intermediate section of said cargo stand when said cargo stand is in said stowed position; and a pair of second latching brackets for removably receiving and retaining at least a portion of said second end of said cargo stand when said cargo stand is in said unstowed position.

4. The scooter of claim 3, wherein said groove comprises a first latching bracket for removably receiving and retaining at least a portion of said first end of said cargo stand when said cargo stand is in said stowed position.

5. The scooter of claim 1, wherein said cargo stand is configured for removably securing a first section of said cargo to said first end of said cargo stand and for removably securing a second section of said cargo to said intermediate section of said cargo stand.

6. The scooter of claim 1, comprising a brake element pivotally coupled to said rear section of said deck and spring-biased away from said rear wheel, wherein at least a portion of said brake element extends through an opening in said rear section of said deck such that application of a pushing force on at least a portion of said brake element rotates said brake element about a pivot and pushes it against said rear wheel to hinder a rotation of said rear wheel; and removal of said pushing force moves said brake element away from said rear wheel.

7. A scooter comprising a steering assembly comprising a front wheel and one or more handle bars configured for steering said front wheel;

an elongated deck comprising a front section and a rear section, said rear section including a rear wheel;

wherein, said steering assembly and said elongated deck are pivotally coupled;

an elongated cargo stand configured for attaching a cargo thereto, said cargo stand comprising opposed first and second ends, said second end pivotally coupled to said elongated deck for rotation about a second axis of rotation, said second axis of rotation being parallel to a first axis of rotation about which said rear wheel rotates; and an intermediate section between said first and said second ends;

wherein, said cargo stand is configurable into a stowed and an unstowed position by rotating said first end about said second axis of rotation such that in said stowed position, said first end rotates towards said front section of said elongated deck and said intermediate section of said cargo stand is flush with at least a top surface of said elongated deck; and in said unstowed position, said first end rotates away from said front section of said elongated deck and said cargo stand is approximately orthogonal relative to said top surface of said elongated deck.

8. The scooter of claim 7, wherein said front section of said elongated deck comprises a first latching bracket for removably receiving and retaining at least a portion of said first end of said cargo stand when said cargo stand is in said stowed position and inhibiting said first end from moving below a bottom surface of elongated deck; and said rear section of said elongated deck comprises a pair of second latching brackets for removably receiving and retaining at least a portion of said second end of said cargo stand when said cargo stand is in said unstowed position.

9. The scooter of claim 8, wherein said elongated deck comprises a longitudinally extending groove in said top surface of said deck, said grove configured for removably receiving and retaining therewithin at least said first end and said intermediate section of said cargo stand when said cargo stand is in said stowed position.

10. The scooter of claim 7, wherein said cargo stand is configured for removably securing a first section of said cargo to said first end of said cargo stand and for removably securing a second section of said cargo to said intermediate section of said cargo stand.

11. The scooter of claim 7, wherein said scooter is configurable into a stowed and an unstowed position by relative rotations of said steering assembly and said elongated deck about one or more pivot axes such that in said stowed position, said front and said rear wheels are in proximity of one another and at least a portion of said front section of said deck and at least a portion of said one or more handle bars are in proximity of one another; and in said unstowed position, said first section of said elongated deck and said front wheel are in close proximity of one another.

12. The scooter of claim 7, comprising a brake element pivotally coupled to said rear section of said deck and spring-biased away from said rear wheel, wherein at least a portion of said brake element extends through an opening in said rear section of said deck such that application of a pushing force on at least a portion of said brake element pushes at least a portion of said brake element against said rear wheel and hinders a rotation of said rear wheel; and removal of said pushing force moves said brake element away from said rear wheel.

* * * * *